Figure 1:
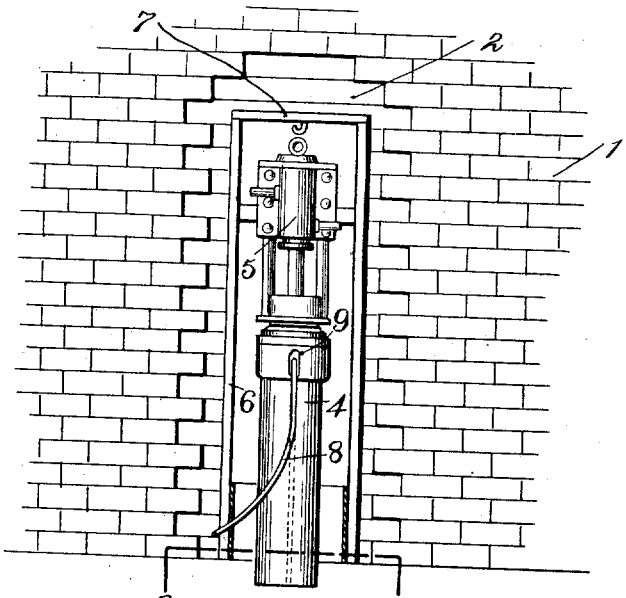

J. BREUCHAUD.

CONSTRUCTION OF SUPPORTS FOR BUILDING WALLS, &c.

APPLICATION FILED DEC. 16, 1911.

Reissued Feb. 18, 1913.

13,532.

3 SHEETS—SHEET 1.

WITNESSES:

J. J. Wallace

William F. Martinez

INVENTOR:

Jules Breuchaud,

By Attorneys,

Fraser, Turk & Myers

COLUMBIA PLANOGRAPH CO., WASHINGTON, D. C.

J. BREUCHAUD.

CONSTRUCTION OF SUPPORTS FOR BUILDING WALLS, &c.

APPLICATION FILED DEC. 16, 1911.

Reissued Feb. 18, 1913. 13,532.

3 SHEETS—SHEET 2.

WITNESSES:

J. J. Wallace

William F. Martinez

INVENTOR:

Jules Breuchaud,

By Attorneys,

Fraser, Trask & Myers

COLUMBIA PLANOGRAPH CO., WASHINGTON, D. C.

J. BREUCHAUD.
CONSTRUCTION OF SUPPORTS FOR BUILDING WALLS, &c.
APPLICATION FILED DEC. 16, 1911.
Reissued Feb. 18, 1913.
13,532.
3 SHEETS—SHEET 3.
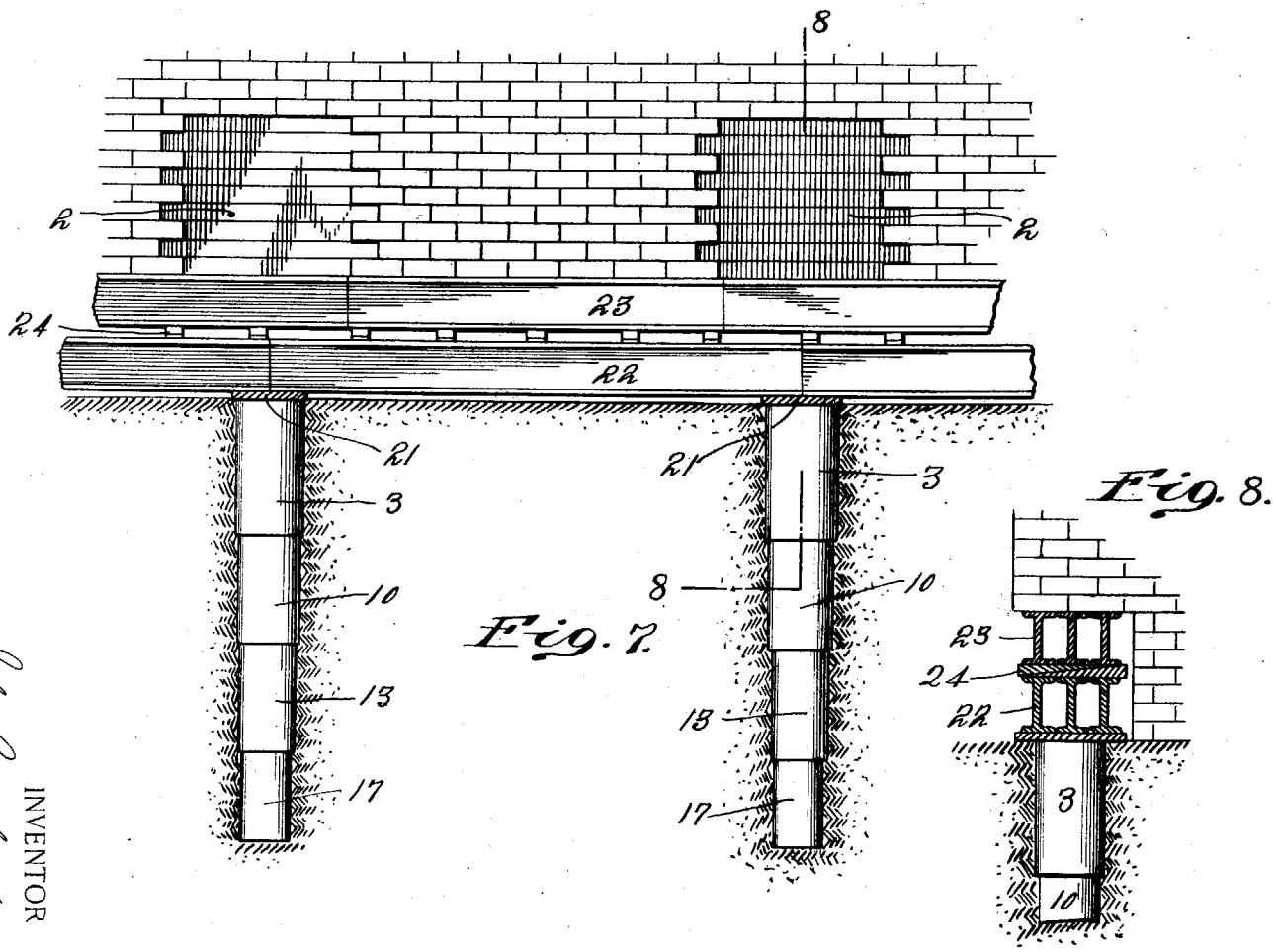
WITNESSES:
J. J. Wallace
William F. Martinez
INVENTOR
Jules Breuchaud,
By Attorneys,
Fraser, Trudinger & Myers
COLUMBIA PLANOGRAPH CO., WASHINGTON, D. C.

UNITED STATES PATENT OFFICE.

JULES BREUCHAUD, OF NEW YORK, N. Y., ASSIGNOR TO THE UNDERPINNING & FOUNDATION COMPANY, OF NEW YORK, N. Y., A CORPORATION OF NEW YORK.

CONSTRUCTION OF SUPPORTS FOR BUILDING-WALLS, &c.

13,532. Specification of Reissued Letters Patent. Reissued Feb. 18, 1913.

Original No. 944,476, dated December 28, 1909, Serial No. 487,543. Application for reissue filed December 16, 1911. Serial No. 666,297.

*To all whom it may concern:*

Be it known that I, JULES BREUCHAUD, a citizen of the United States, residing formerly at Yonkers, in the county of Westchester and State of New York, and now residing in the city, county, and State of New York, have invented certain new and useful Improvements in Construction of Supports for Building-Walls, &c., of which the following is a full, clear, and exact specification.

My invention relates to an improvement in the means and methods of underpinning building walls or other structures, or providing new and improved foundations therefor.

When an excavation for a new building is to go below the foundations of the walls of an adjoining building, it is necessary that such wall shall be suitably supported against settlement due to the excavation in the adjoining lot and to the consequent disturbance of the soil. Previous to my Patent No. 563,130, such wall was usually temporarily supported during such work by needle beams, etc., and when the excavation and sinking of the caissons in the adjoining lot were completed, such temporary support was replaced by a new and permanent support. In my said patent I called attention to the disadvantages of said old method, which I overcome by the method therein described, wherein a sectional cylinder was sunk to firm substrata, such as hard pan or bed rock, by the action of a jack acting against the resistance furnished by the weight of the wall to be underpinned. In the numerous and almost universal application which my said patented method has secured, it has demonstrated its immense value, as by means of it buildings have been provided with new foundations extending to bed rock, which were of such size and weight as to have made it impossible adequately to support and underpin them by prior methods. In the course of such operations it has developed that hard pan, bed rock, or other suitable firm substrata, occasionally lie at such depth that where working below water level, with the pneumatic method and its large sized cylinders, it sometimes happens that it is practically impossible, or at least not safe, to sink cylinders, owing to their extreme resistance. For instance, where a cylinder of thirty inches diameter had been sunk upward of fifty feet and it was desired to continue the sinking until rock was reached, jacks aggregating upward of three hundred tons capacity failed to budge the cylinder. It is obvious, therefore, if means could be found to overcome this extreme friction in sinking a deep pipe or column, it would add to the value of such method. Occasionally, also, it happens that the particular wall being underpinned or provided with a new or additional foundation, may not be capable of resisting the action of the jacks and it would be found necessary to devise troublesome and costly expedients to permit the weight of the said wall to be availed of to sink the cylinder, and a method whereby the sectional cylinders could be safely sunk under the existing wall, without bringing strain or stress to bear upon said wall, and without depriving it of the supporting power of its original foundations, would be a valuable addition to existing modes of underpinning walls.

My invention, therefore, has for its object to provide means whereby a supporting column may be sunk under an existing wall, without depriving said wall of its original foundation, and without bringing any stress or strain on the wall being underpinned, and without making use of the weight of the said wall.

A further object of my invention is to enable a supporting sectional column or cylindrical pier to be sunk centrally under an existing building wall or other structure to bed rock or other firm substrata, without the frictional resistance usually incident thereto.

The foregoing and other objects, which will appear as the description proceeds, I accomplish by the method and apparatus illustrated in the accompanying drawings, wherein—

Figure 2:
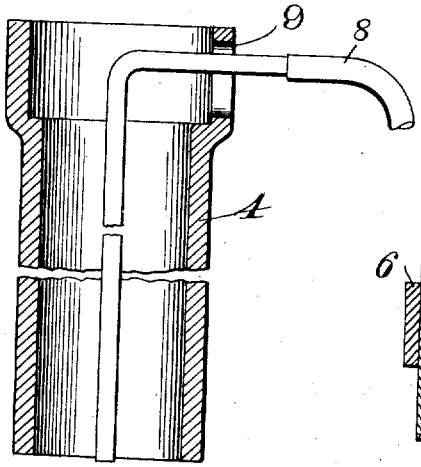
Figure 3:
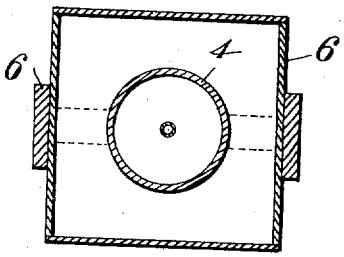
Figure 4:
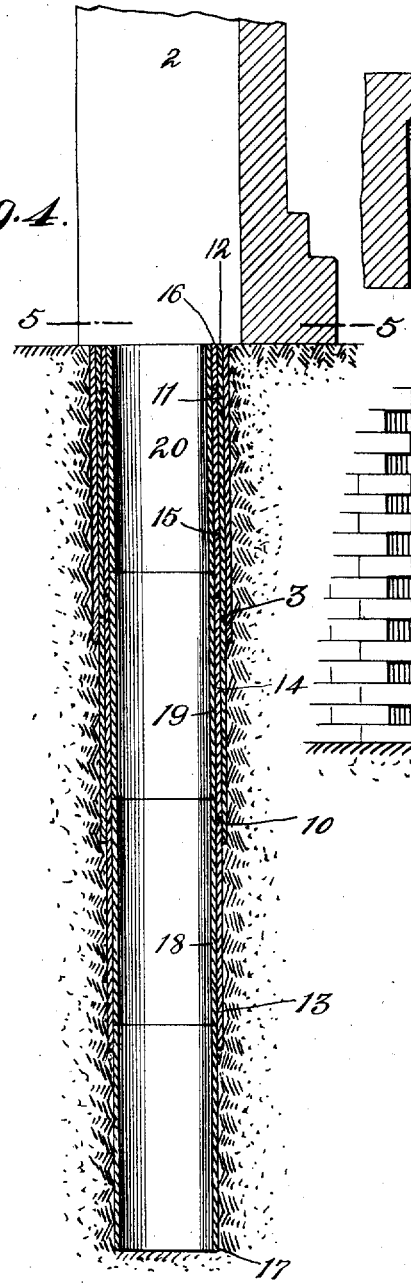
Figure 5:
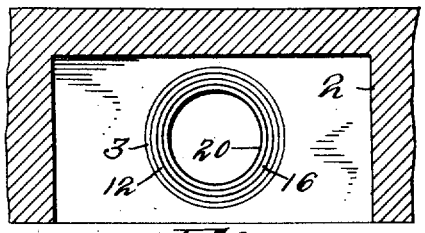
Figure 6:
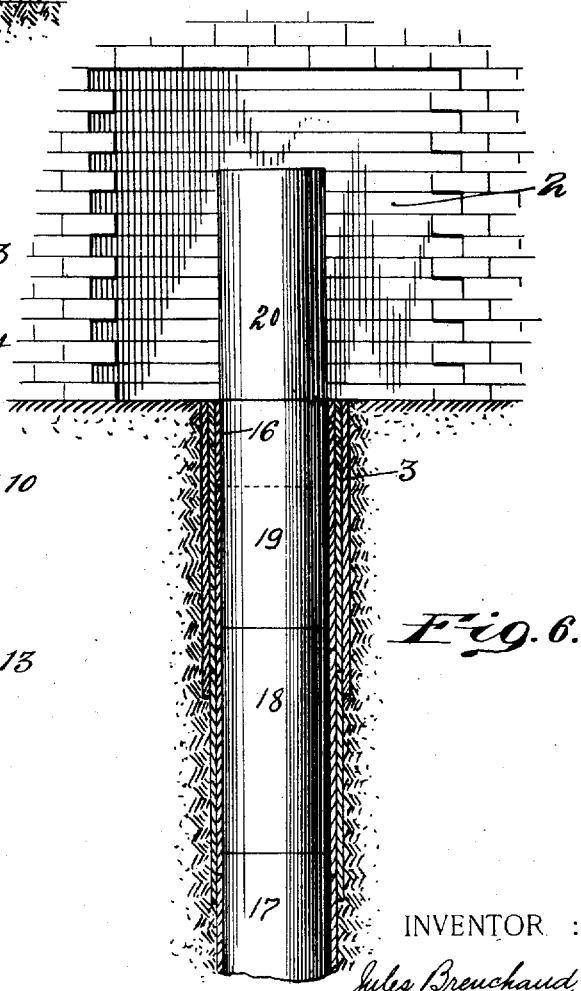

Figure 1 is a side elevation, partly in section, of the base of a building wall, illustrating a cylinder in position and the means for driving same. Fig. 2 is a cross-section on line 2—2 of Fig. 1. Fig. 3 is a detail illustrating a sectional elevation of hammering-head and water-jetting pipe. Fig. 4 is a sectional elevation of a completed column in position under the wall. Fig. 5 is a cross-section on line 5—5 of Fig. 4. Fig. 6 is a view similar to Fig. 5, illustrating the column partly completed. Fig. 7 is a side elevation of a building wall having two supporting columns in place, and a connection between the same and with the wall; and Fig. 8 is a cross-section on line 8—8 of Fig. 7.

My new method of applying force to a column for the purpose of sinking it is illustrated in Figs. 1, 2, and 3, and it consists in part in the provision of means whereby a succession of extremely short, powerful blows may be delivered upon the head of such column, with great rapidity.

Within the building wall 1, near its base and extending downward through its base, I cut a recess 2, and within this recess and resting upon the ground I place the cylinder 3 to be sunk as a part of the foundation. This cylinder is surmounted by an upper section 4, which is not intended as a part of the permanent foundation, but is maintained as the upper part of column during sinking.

Blocks may be interposed between the upper section 4 and the successive cylinder sections as the latter sections are sunk and additional sections added.

Resting upon the upper end of the upper or hammering section 4, is a steam hammer 5, which I select for the purpose of its capacity for delivering short, rapid, and powerful blows to the hammering section 4, and which drives or sinks the successive cylinder sections. It is not essential, however, that a steam hammer should be employed for this purpose, as other equivalent devices may be substituted: *e. g.*, an electric hammer, a pneumatic hammer, or other devices capable of delivering the character of blow required.

The steam hammer 5 may be maintained in position and its vertical alinement preserved by ways 6, forming part of a frame 7, which, although not essential, will be found useful for this purpose as well as for assisting in supporting the hammer out of the way when a new cylinder section is put in place.

The foregoing constitute the new means employed to sink the cylindrical foundations, which I will now describe. The first cylindrical foundation, section 3, while being sunk to place by the steam hammer, is assisted by a water-jet applied near the lower part of the section, through pipe 8, which enters hole 9 in hammering section 4, and extends down through the interior of the various foundation cylinders, and may have a coupling near its upper end to render it extensible. It will therefore be perceived that when section 3 has been driven to place by the steam hammer, it will be substantially clear of soil which has been loosened up and floated off by the water-jet. When, therefore, the second section of cylinder 10, which is of somewhat less diameter than 3, so as to fit snugly within it, is put in place, it may be easily forced as far as section 3 has been sunk, and a new section 11, of the same diameter as 10, may then be added to it and the column thus formed sunk to its place, and substantially the only resistance to be overcome will be the friction between section 10 and the soil. A short section 12 may be added to cause the concentric cylinders to break joints. The sections for successive columns are then sunk in the same manner, each succeeding column being located within the preceding one and projecting at the foot to the extent preferably of one section. Each column as it is sunk will, by the aid of the water-jet, have the soil within the walls removed and thereby, as each successive column is sunk, it will encounter practically no resistance until it has traversed the extent to which the previous column has been sunk, and therefore the only force required will be that equal to driving one section of cylinder into the earth. Thus a large saving in the force required to sink the columns is effected. For instance, assuming a column to have four sections, by the precise method illustrated in my prior Patent No. 563,130, a force to sink these equal to driving four single sections is utilized and this must be equal to simultaneously driving four sections; whereas by my present method only one section is driven at a time and the force required for this is only one fourth of that required to sink a unitary column of four sections, and the total force is that required to sink four single sections.

If desired, the interior sections or "followers" 11, 12, 14, 15, 16, 18, 19 and 20 may be removed and the cylinder sections 3, 10, 13 and 17 connected together by bolts, etc., thereby forming a continuous column which may then be filled with concrete, capped, and connected to the wall as usual, or if it is desired to use compressed air within the column, the cylinder sections 3, 10, 13 and 17 may have air-tight joints formed between them after the removal of the followers and before filling with concrete or capping. These followers, however, may be allowed to remain and they will have the effect of stiffening the column and will add to its power to sustain a load.

When adjacent columns are in proper supporting position and have been cleaned out and filled with concrete, they are capped as by plates 21, upon which are placed horizontal I-beams 22, to the number required connecting such adjacent cylinders. The lower part of the wall intermediate adjacent recesses 2 having been removed sufficiently for that purpose, I-beams 23, to the number required, are then located beneath said wall in position to receive the weight of the same and transmit, through beams 22, to the cylinders and the voids in the wall filled in with brickwork, etc. Wedges 24 are then driven between the I-beams 23 and 22, bringing the weight of the wall on the new foundations.

It will be observed that the upper beams 23 connect with the wall at quite a distance above the original base or foundation of the wall, and this is important, as substantial brickwork is much more apt to be found there than it is at the base, and owing to the fact that the weight of the wall is concentrated, it is important that the wall should be in good condition. Also by employing two sets of I-beams and wedging between them, I am enabled to wedge to much better advantage, and sooner than if an attempt were made to wedge between brickwork. It will also be observed that the wall is supported throughout a larger part of its base, when the I-beams are continued from one column to another, it being then supported throughout the entire base portion thereof.

While I have illustrated in the foregoing a concrete embodiment of the apparatus designed to carry out my new method and of my new construction of supports for walls, etc., it is of course understood that in many respects the same is illustrative merely and that changes and modifications may be made therein and equivalent devices employed without departing from my invention.

The new construction of cylindrical foundation herein illustrated may be forced into the ground by means of a jack acting against existing wall as a buttress, if desired, in the manner fully described in my Patent No. 563,130.

My system of sectional cylinders is particularly available where piles are required to be located close to a building wall. Here the shock of driving the cylinders by the use of the ordinary pile-driving hammer is great and is often dangerous to adjoining property. By the use of my invention, sectional cylinders may be driven close to a wall with no bad consequences, for not only is the resistance of any one section to sinking much less than would be the case with a non-telescopic, integral pile, but in addition the employment of a sectional cylinder lessens the shock felt at the surface of the earth, as an integral cylinder acts to transmit such shocks. Therefore I do not intend to be understood as confining my employment of the telescopic, sectional cylinder to large cylinders sunk under walls, but such construction is well adapted to be used in sinking cylinders for a pile of smaller diameter, which may be sunk by the ordinary pile driver by a steam or pneumatic or electric or other power hammer, by the aid of the water jet, and filled with concrete or not, as desired, and which will then form a useful and desirable foundation and will have been inserted in place much more quickly, more easily, and with less force than would solid piles. In case the cylinders are not filled with concrete, I prefer to retain the followers.

The main object achieved by my invention is the reduction in the friction consequent upon the driving of the cylinders, and the employment of sectional cylinders is desirable where overhead space is limited; *e. g.*, in underpinning a wall, but in driving cylinders in an open lot by the side of a wall, or where head space is obtainable, unitary columns may be employed to achieve the same advantage.

The power hammer which I have referred to as a desirable means of driving foundation pipes into the earth, although illustrated in connection with the hydraulic method of sinking, may be equally well employed in connection with the pneumatic method.

I have illustrated the use of the water jet as one practicable mode of removing the material from within the caissons as they are sunk, but other modes of removing such soil may be employed and my invention is not limited to the use of the water jet. For instance, where the pipes are large enough a man may be sent down to excavate, or dredging may be employed, as for instance, by the employment of an orange peel bucket, or an auger may be used or a vacuum remover may be used, or a scoop. Different methods suited to different conditions are well known to the engineer.

While I have shown the hammer as located within the vertical planes of the wall and directly over the cylinder to be sunk, delivering its blows directly to the cylinder vertically beneath it, it is not essential that the hammer should be so located, but it might in many cases be situated to one side of the wall and deliver its impact to a beam located on the top of the cylinder projecting laterally beneath the hammer. In such case a pile driving hammer might be employed, for instance a Nasmath hammer or a trip hammer.

What I claim is:—

1. The method of constructing foundations for a building wall or other structure, which consists in sinking a hollow column perpendicularly into the earth beneath said wall, in removing the soil from said column, in then sinking a second hollow column of greater length substantially concentrically within the first to a greater depth and sufficient to bring the upper edges approximately even, and again cleaning, and so on until the desired depth is reached.

2. The method of underpinning a building wall or other structure, which consists in sinking a column perpendicularly into the earth beneath said wall, in removing the earth from said column, in then sinking a second column composed of superposed sections each section of the same diameter, concentric with and within the first, to a greater depth so that their tops are substantially level, and again cleaning, and so on until the desired depth is reached, and in then connecting the completed column to the wall.

3. The method of constructing a foundation for a building wall or other structure, which consists in constructing a recess in vertical alinement with the foundation of said wall, in locating a power hammer therein, in driving a column perpendicularly into the earth beneath said wall by impact of said hammer, in removing the soil from said column, in then sinking a second column within the first by the same means, to a greater depth so that their tops are substantially level, again cleaning, and so on until the desired depth is reached, and in then connecting the completed column to the wall.

4. The method of constructing a foundation for a building wall or other structure, which consists in sinking a column perpendicularly into the earth beneath said wall, in removing the soil from said column, in then sinking a second column composed of superposed sections each section of the same diameter within the first to a greater depth so that their tops are substantially level and again cleaning, and so on until the desired depth is reached, in then connecting the upper ends of said columns with beams and locating beams parallel with and above the same and adjacent to the wall, and driving wedges between said beams.

5. The method of underpinning a building wall or other structure, which consists in cutting a recess therein, in locating a power hammer therein, in sinking a column perpendicularly into the earth beneath said wall, in removing the soil from said column, in then sinking a second column composed of superposed sections each section of the same diameter within the first to a greater depth so that their tops are substantially level and again cleaning, and so on until the desired depth is reached, in then connecting the upper ends of said columns with beams, and locating beams parallel with and above the same and adjacent to the wall, and driving wedges between said beams.

6. In the construction of foundations, the method which consists in forcing a hollow column into the earth, excavating the earth from said column, then inserting a second hollow column within the first, said second column fitting within the first and being guided thereby as it is sunk, superposing a follower thereon and driving down said follower to sink such second column into the earth below such first column until the top of the follower is substantially level with the top of the first column, excavating the earth therefrom, and repeating these operations until the desired depth is reached.

7. In the construction of foundations, the method which consists in forcing a hollow column into the earth, excavating the earth from said column, then inserting a second hollow column within the first, superposing a follower thereon and driving down said follower to sink such second column into the earth below such first column until the top of the follower is substantially level with the top of the first column, said second column fitting in the first and being guided thereby as it is sunk, excavating the earth therefrom, repeating these operations until the desired depth is reached, and then removing the followers.

8. In the construction of foundations, the method which consists in forcing a hollow column into the earth, excavating the earth from said column, then inserting a second hollow column within the first, superposing a follower thereon and driving down said follower to sink such second column into the earth below such first column until the top of the follower is substantially level with the top of the first column, said second column fitting in the first and being guided thereby as it is sunk, excavating the earth therefrom, repeating these operations until the desired depth is reached, then removing the followers, and finally filling the excavated space with concrete.

9. In the construction of foundations, the method which consists in forcing a hollow column into the earth by force applied at or above substantially the level of the adjacent surface of the earth, in excavating the earth from within said column, then inserting a second hollow column within the first, superposing a follower thereon and driving the same into the earth below such first column by force similarly applied, until the top of the follower is substantially level with the top of the first column, said second column fitting within the first and being guided thereby, excavating the earth therefrom and repeating these operations until the desired depth is reached, withdrawing the followers and filling the completed column with concrete.

10. In the construction of foundations, the method which consists in forcing a hollow column into the earth, by force applied at or above substantially the level of the adjacent surface of the earth, in excavating the earth from within said column by excavating operations conducted from the surface, then inserting a second hollow column within the first, superposing a follower thereon and driving the same into the earth below such first column by force similarly applied, until the top of the follower is substantially level with the top of the first column, said second column fitting within the first and being guided thereby, excavating the earth therefrom by excavating operations conducted from the surface, and repeating these operations until the desired depth is reached, withdrawing the followers and filling the completed column with concrete.

Signed at New York city, this 15th day of December, 1911.

JULES BREUCHAUD.

Witnesses:
MARTIN B. MEAGHER,
RUTH MORRIS.

Copies of this patent may be obtained for five cents each, by addressing the "Commissioner of Patents, Washington, D. C."